United States Patent
Li et al.

(10) Patent No.: US 9,494,488 B2
(45) Date of Patent: Nov. 15, 2016

(54) METHOD AND APPARATUS TO DETERMINE ROTATIONAL POSITION OF A PHASER IN A VARIABLE PHASING SYSTEM

(71) Applicant: GM GLOBAL TECHNOLOGY OPERATIONS LLC, Detroit, MI (US)

(72) Inventors: Shifang Li, Shelby Township, MI (US); Jyh-Shin Chen, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 310 days.

(21) Appl. No.: 14/337,495

(22) Filed: Jul. 22, 2014

(65) Prior Publication Data

US 2016/0025595 A1 Jan. 28, 2016

(51) Int. Cl.
*G01M 15/06* (2006.01)

(52) U.S. Cl.
CPC .............. *G01M 15/06* (2013.01); *Y02T 10/18* (2013.01)

(58) Field of Classification Search
CPC ............. F02D 41/009; F02D 2041/1431; F02D 41/0002; G01M 15/06; Y02T 10/18
USPC ........................................ 73/114.26
See application file for complete search history.

(56) References Cited

U.S. PATENT DOCUMENTS

| | | | | |
|---|---|---|---|---|
| 6,915,767 B2 * | 7/2005 | Pfeiffer | ............. | F01L 1/34 123/90.15 |
| 7,036,472 B2 * | 5/2006 | Mencher | ............. | F02D 41/009 123/90.15 |
| 7,428,459 B2 * | 9/2008 | Kondo | ............. | F02D 41/009 123/406.18 |
| 8,096,271 B2 * | 1/2012 | Hu | ............. | F01L 1/047 123/347 |
| 8,495,981 B2 * | 7/2013 | Stewart | ............. | F01L 1/34 123/179.16 |
| 9,341,088 B2 * | 5/2016 | Stewart | ............. | F01L 1/344 |
| 2002/0096134 A1 * | 7/2002 | Michelini | ............. | F02D 37/02 123/90.15 |
| 2016/0025595 A1 * | 1/2016 | Li | ............. | G01M 15/06 73/114.26 |

* cited by examiner

*Primary Examiner* — Freddie Kirkland, III
(74) *Attorney, Agent, or Firm* — Quinn Law Group, PLLC

(57) ABSTRACT

A method to determine a rotational position of a phaser for variable phasing system including a low-resolution rotational position sensing system includes estimating a rotational position of the phaser based upon a time interval between occurrence of a measured position of the phaser and a present periodic timepoint, a commanded position of the phaser, said measured position of the phaser, and a time constant of the variable phasing system when the occurrence of the measured position of the phaser is subsequent to a preceding periodic timepoint occurring at a set time interval prior to the present periodic timepoint.

17 Claims, 2 Drawing Sheets

METHOD AND APPARATUS TO DETERMINE ROTATIONAL POSITION OF A PHASER IN A VARIABLE PHASING SYSTEM

TECHNICAL FIELD

This disclosure relates to variable phasing systems configured to monitor position of a phaser, including variable phasing systems deployed on internal combustion engines.

BACKGROUND

The statements in this section merely provide background information related to the present disclosure and may not constitute prior art.

Internal combustion engines employ camshafts to control openings and closings of intake and exhaust valves in concert with piston position and crankshaft rotation to effect repetitive engine cycles of intake, compression, power and exhaust in each combustion chamber. Some engine configurations employ variable valve control systems to control timing of the openings and closings of the intake and exhaust valves in relation to piston position to modify engine breathing to alter volumetric efficiency and otherwise affect engine performance in response to operator commands, engine operating conditions (e.g., warm-up or steady-state), ambient conditions, engine combustion modes, and other conditions.

SUMMARY

A variable phasing system including a low-resolution rotational position sensing system is configured to monitor position of a phaser. A method to determine a rotational position of the phaser includes periodically executing a control routine for controlling the variable phasing system responsive to a commanded position of the phaser. A rotational position of the phaser is estimated at a present periodic timepoint based upon a time interval between occurrence of a measured position of the phaser and the present periodic timepoint, a commanded position of the phaser, said measured position of the phaser, and a time constant of the variable phasing system when the occurrence of the measured position of the phaser is subsequent to a preceding periodic timepoint occurring at a set time interval prior to the present periodic timepoint. The rotational position of the phaser also includes estimating a rotational position of the phaser at the present periodic timepoint based upon a time interval between the preceding periodic timepoint and the present periodic timepoint, the commanded position of the phaser, an estimated rotational position of the phaser at the preceding periodic timepoint, and the time constant of the variable phasing system when occurrence of the measured position of the phaser is prior to the preceding periodic timepoint.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

Figure 1:
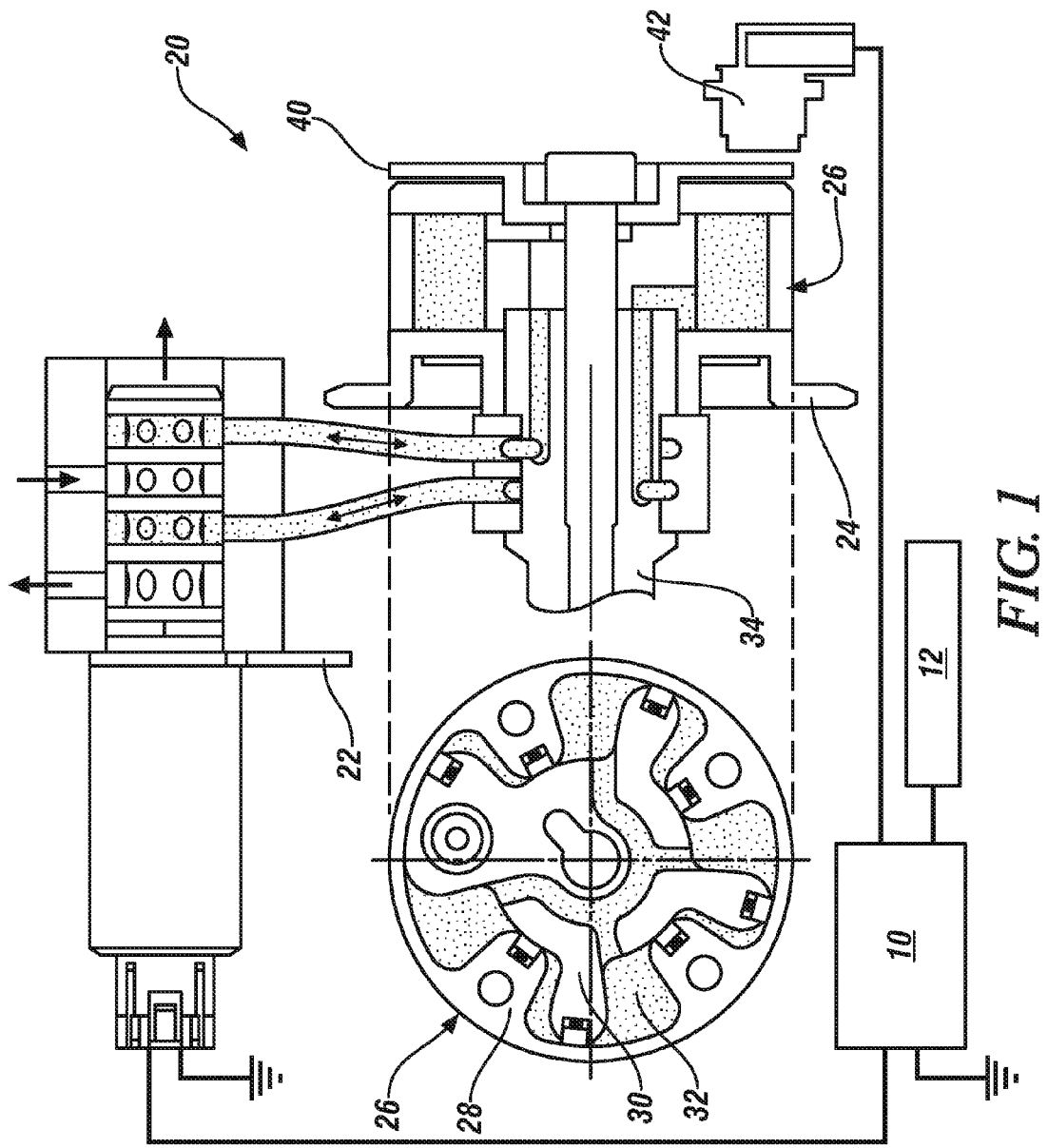
FIG. 1 schematically illustrates a variable phasing system assembled onto a camshaft of an internal combustion engine, in accordance with the disclosure.

Referring now to the drawings, wherein the depictions are for the purpose of illustrating certain exemplary embodiments only and not for the purpose of limiting the same, FIG. 1 schematically illustrates an embodiment of an adjustable rotating phasing device employing a low-resolution rotational position sensing system. One embodiment of an adjustable rotating phasing device includes a variable phasing system 20 that assembles onto a camshaft 34 of an internal combustion engine. The variable phasing system 20 includes a cam phasing actuator (phaser) 26, an oil control valve 22, a cam target wheel 40 and a cam position sensor 42.

The phaser 26 includes a cylindrically-shaped body portion 28 and a moveable phasing element 30 that is coaxial to the camshaft 34 of the internal combustion engine. The camshaft 34 can be associated with either intake valves or exhaust valves of the engine. The body portion 28 of the phaser 26 fixedly attaches to a sprocket 24, which interacts with a timing chain or another gear linkage to rotatably couple to an engine crankshaft such that the body portion 28 rotates in concert with the engine crankshaft. The body portion 28 of the phaser 26 is also referred to as a stator, which preferably employs mechanical stops to limit magnitude of cam phasing relative to the crankshaft position. The moveable phasing element 30 rotatably couples to the camshaft 34 and the cam target wheel 40, the rotation of which is monitored by the cam position sensor 42. The cam position sensor 42 can be any edge sensing device capable of generating an electrically-readable signal in response to passing of an edge of the cam target wheel 40, including by way of example, a Hall-effect sensor, a magnetostrictive sensor, a variable reluctance sensor or another suitable edge sensing device. The cam target wheel 40 is a low-resolution device preferably having a plurality of equally spaced detection edges, e.g., falling edges that are indexed at equivalent magnitudes of cam rotation. In one embodiment, the low-resolution cam target wheel 40 has four equally spaced falling edges that are indexed at 90° of cam rotation, and thus are indexed at 180° crank angle degrees. The low-resolution cam target wheel 40 can employ other quantities of detection edges, including, e.g., a target wheel having six equally spaced detection edges or a target wheel having eight equally spaced detection edges. Rotation of the crankshaft is monitored by a crankshaft sensor 12 signally connected to controller 10.

The oil control valve 22 controls flow of pressurized oil 32 to the phaser 26 in response to a control signal originating from controller 10, with the flow of pressurized oil 32 acting upon the moveable phasing element 30 of the phaser 26 to effect rotational movement of the moveable phasing element 30 and the camshaft 34 in relation to rotation of the body portion 28 of the phaser 26 and hence in relation to rotation of the engine crankshaft.

The controller 10 executes algorithmic code to control the oil control valve 22 to control flow of pressurized oil to the phaser 26 in response to a control signal originating from controller 10 to effect feedback and/or feed-forward position control of the moveable phasing element 30 and the camshaft 34 in response to a control signal that is associated with a commanded camshaft rotational position relative to a rotational position of the crankshaft. In a four-cycle engine configuration, one complete 360° rotation of the engine crankshaft corresponds to 180° of rotation of the camshaft 34, and two complete rotations of the engine crankshaft corresponds to 360° of rotation of the camshaft 34 to effect appropriate openings and closings of the intake and/or exhaust valves in accordance with demands of engine breathing related to the engine cycles of intake, compression, power and exhaust.

The controller 10 has a set of control routines executed to provide desired functions. Control routines are executed, such as by a central processing unit, to monitor inputs from sensing devices and other networked control modules, and to control operation of actuators. The control routines include periodic routines and event-driven routines. Periodic routines execute at a constant rate with set time intervals there between. Examples of set time intervals for periodic routines include intervals of 100 microseconds or 3.125, 6.25, 12.5, 25 and 100 milliseconds. Examples of periodic routines include routines to calculate intake air flow and determine engine volumetric efficiencies. Event-driven routines execute in response to an event, such as in response to a signal from a sensor that triggers the event. As such, event-driven routines execute asynchronously to periodic routines. An example of an event-driven routine includes a routine to determine rotational position of the phaser 26 that is triggered by detection of a falling edge of a cam target wheel 40.

Controller, control module, module, control, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables.

Figure 2:
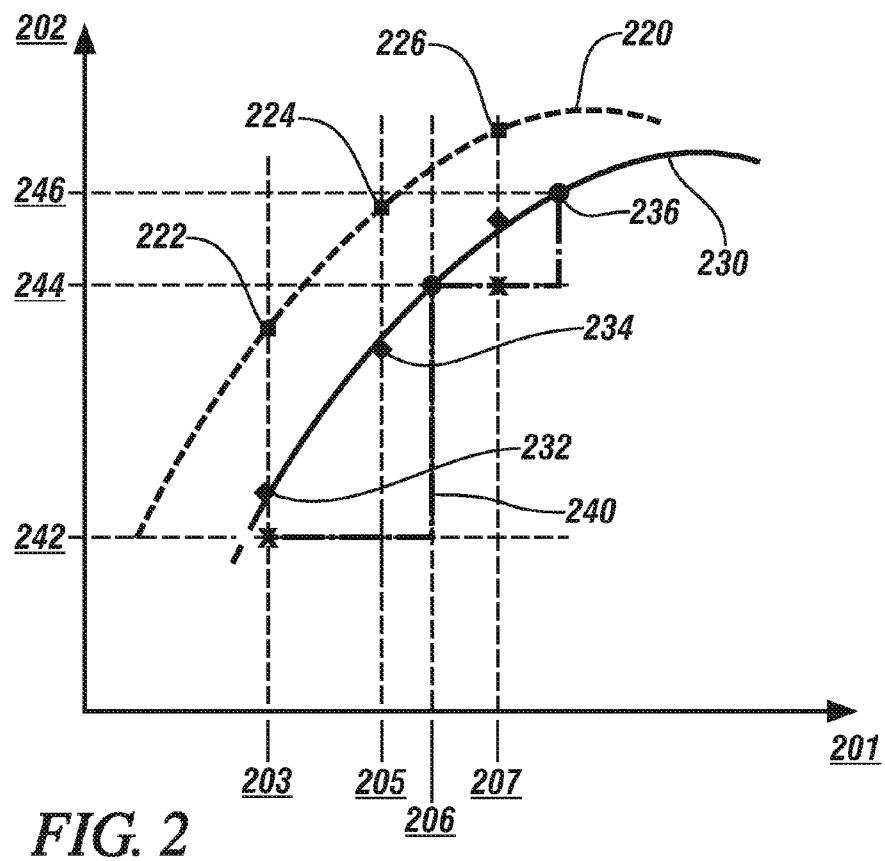
FIG. 2 graphically shows a commanded rotational position curve, an estimated rotational position curve and a measured rotational position curve for a phaser of a variable phasing system, with rotational positions shown in relation to time, in accordance with the disclosure.

FIG. 2 graphically shows a commanded rotational position curve 220, an actual rotational position curve 230 and a discretized measured rotational position line 240 for a variable phasing system, with rotational position shown on the vertical axis 202 in relation to time on the horizontal axis 201. As described herein, the rotational positions relate to rotational position of the moveable phasing element 30 and the camshaft 34 of the variable phaser system 20 described with reference to FIG. 1. It is understood that the concepts described herein apply to other variably controllable rotating devices and variable phasing systems that employ a low-resolution rotational position sensing system as an element of a feedback or feed-forward position control scheme.

Timepoints 203, 205, 206 and 207 are shown on the horizontal axis, with timepoints 203, 205 and 207 defining periodic timepoints occurring at set time intervals, including a set time interval $\Delta t_1$ between timepoints 203 and 205 and between timepoints 205 and 207. The set time interval $\Delta t_1$ for the periodic timepoints is analogous to one of the set time intervals at which a controller executes periodic control routines. A second time interval $\Delta t_2$ is an event-driven time interval that is shown between timepoints 206 and 207, with timepoint 206 corresponding to occurrence of measured rotational position $y_{meas}$ 244. The measured rotational position $y_{meas}$ 244 occurs in response to detection of a signal from the rotational position sensing system, which is the event that drives the measuring and recording of the measured rotational position $y_{meas}$ 244 and the corresponding timepoint 206. The commanded rotational position curve 220 shows commanded rotational positions of $u_{k-2}$ 222, $u_{k-1}$ 224 and $u_k$ 226, with the commanded rotational positions generated at timepoints 203, 205 and 207, respectively. The measured rotational position curve 240 shows measured rotational positions of $y_{meas-1}$ 242, $y_{meas}$ 244 and $y_{meas+1}$ 246. The actual rotational position curve 230 shows estimated rotational positions of $y_{k-2}$ 232, $y_{k-1}$ 234 and $y_k$ 236, which are estimated at timepoints 203, 205 and 207, respectively.

Rotational position of variable phasing system employing a measurement system including a low-resolution rotational position sensing system, e.g., an embodiment of the phaser 26 of the variable phasing system 20 described with reference to FIG. 1 can be dynamically estimated at periodically occurring timepoints as follows. When the rotational position of the phaser has been measured subsequent to a preceding periodic timepoint occurring at a set time interval prior to the periodic timepoint, the rotational position of the phaser is dynamically estimated at the present periodic timepoint based upon a time interval between occurrence of the measured position of the phaser and the present periodic timepoint, a commanded position of the phaser, the measured position of the phaser, and a time constant of the variable phasing system in accordance with a relationship as follows:

$$y_k = \frac{\tau - \Delta t_2}{\tau} y_{meas} + \frac{\Delta t_2}{\tau} u_{k-1} \quad [1]$$

wherein:
$y_k$ is the estimated rotational position at the present periodic timepoint;
$\Delta t_2$ is the time interval between occurrence of the measured position of the phaser and the present periodic timepoint;
$u_{k-1}$ is the commanded position of the phaser;
$y_{meas}$ is the measured position of the phaser; and
$\tau$ is a time constant of the variable phasing system.

The various terms are graphically shown with reference to FIG. 2.

When the rotational position of the phaser has not been measured subsequent to a preceding periodic timepoint occurring at a set time interval prior to the present periodic timepoint, the rotational position of the phaser is dynamically estimated based upon a time interval between the previous periodic timepoint and the present periodic timepoint, i.e., the periodic time interval, the commanded position of the phaser, an estimated rotational position of the phaser at the preceding periodic timepoint, and the time constant of the variable phasing system in accordance with a relationship as follows:

$$y_{k-1} = \frac{\tau - \Delta t_1}{\tau} y_{k-2} + \frac{\Delta t_1}{\tau} u_{k-2} \quad [2]$$

wherein:
$y_{k-1}$ is the estimated rotational position;
$\Delta t_1$ is the periodic time interval;
$u_{k-2}$ is the commanded position of the phaser;
$y_{k-2}$ is the estimated rotational position of the phaser at the preceding periodic timepoint; and
$\tau$ is the time constant of the variable phasing system.

The various terms are graphically shown with reference to FIG. 2.

Eq. 2 may be rewritten generically as follows:

$$y_k = \frac{\tau - \Delta t_1}{\tau} y_{k-1} + \frac{\Delta t_1}{\tau} u_{k-1} \quad [3]$$

wherein:
$y_k$ is the estimated rotational position;
$\Delta t_1$ is the periodic time interval;
$u_{k-1}$ is the commanded position of the phaser;
$y_{k-1}$ is the estimated rotational position of the phaser at the preceding periodic timepoint; and
$\tau$ is the time constant of the variable phasing system.

The time constant $\tau$ of the variable phasing system is a parameter that characterizes responsiveness of the variable phasing system, with responsiveness measured in terms of a time response to a step input change to the commanded position. As appreciated, the time response is a measure of the time it takes the system to reach (1−1/e) or 63.2% of the commanded position. The time constant $\tau$ of the variable phasing system is system-dependent, and can be empirically determined using a representative variable phasing system in a controlled setting. When the variable phasing system is deployed on an internal combustion engine, values for the time constant $\tau$ can be determined using a representative variable phasing system on a representative internal combustion engine operating on a dynamometer or another related setting. The time constant $\tau$ of the variable phasing system may be dependent upon operating parameters of the internal combustion engine and the variable phasing system, including operating parameters that affect engine oil flow and pressure, such as engine temperature and engine speed/load operating points. Engine temperature may be a factor that influences the time constant $\tau$ of the variable phasing system due to a relation between oil viscosity, and thus flow and pressure, and engine temperature. Thus, a control system may employ different values for the time constant $\tau$ including an increased value at lower engine temperatures to account for increased response time due to higher viscosity at the lower engine temperatures. Engine speed/load operating points may influence the time constant $\tau$ of the variable phasing system due to a relation between oil flowrate and pressure and engine speed, which affects operation of a mechanical oil pump driven from the engine crankshaft. Thus, a control system may employ different values for the time constant $\tau$ including a decreased value at higher engine speeds to account for decreased response times due to greater oil flowrates and pressures at the higher engine speeds. Other factors affecting the magnitude of a time constant $\tau$ for a variable phasing system fall within the scope of this disclosure.

Figure 3:
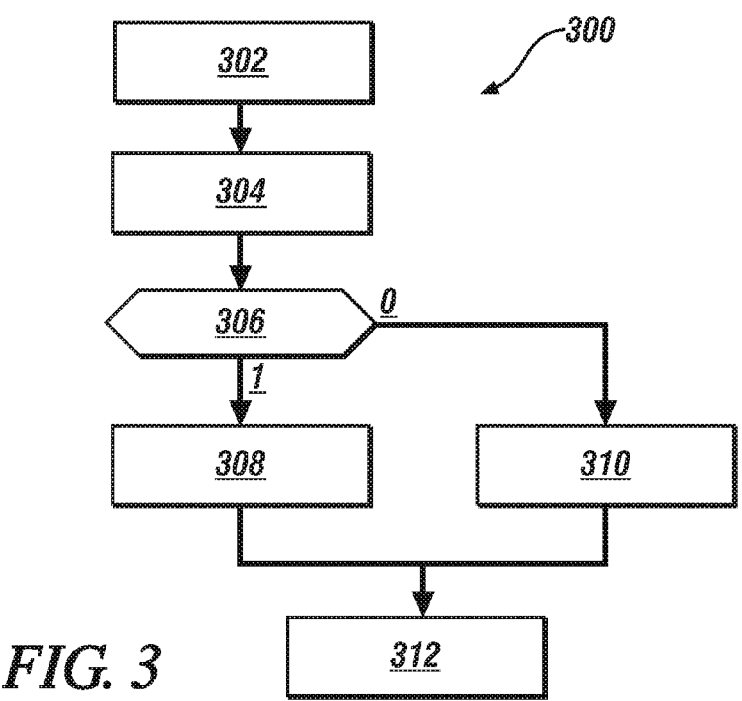
FIG. 3 is a flowchart depicting a rotational position estimation routine to determine a rotational position of an adjustable phaser of a variable phasing system including a low-resolution rotational position sensing system, in accordance with the disclosure.

FIG. 3 is a flowchart depicting a rotational position estimation routine 300 to determine a rotational position of an adjustable phaser of a variable phasing system including a low-resolution rotational position sensing system, e.g., the variable phasing system 20 described with reference to FIG. 1. Table 1 is provided as a key wherein the numerically labeled blocks and the corresponding functions are set forth as follows.

TABLE 1

| BLOCK | BLOCK CONTENTS |
|---|---|
| 300 | Rotational position estimation routine |
| 302 | Monitor oil temperature, engine speed and load, phaser position |
| 304 | Select time constant $\tau$ for the variable phasing system |
| 306 | Has rotational position of the phaser been measured since a preceding periodic timepoint? |
| 308 | Estimate rotational position of the phaser using Eq. [1] |
| 310 | Estimate rotational position of the phaser using Eq. [2] |
| 312 | End iteration |

The rotational position estimation routine 300 is periodically executed during operation of the system on which it has been deployed to dynamically estimate the rotational position of the phaser. The rotational position of the phaser is employed in the system for various purposes, including system control. When the system is an internal combustion engine and the phaser is a cam phasing actuator of a variable phasing system, the rotational position is employed to determine engine volumetric efficiency for purposes of engine fueling management, spark control, and/or exhaust gas recirculation control. The rotational position estimation routine 300 executes at a time period that coincides with or is greater than the execution period of a control routine for controlling the variable phasing system, which can be a 6.25 ms time period in one embodiment.

Each iteration, the rotational position estimation routine 300 monitors operating parameters, including, e.g., oil temperature, engine speed and load, and phaser position (302). Direct measurement of the rotational position of the phaser is event-driven, with the measurement system determining the rotational position when triggered by detecting a signal output from the low-resolution rotational position sensing system.

The monitored information is employed to select a time constant $\tau$ for the variable phasing system (304). The time constant $\tau$ may be a calibrated value that is dependent upon states of the monitored operating parameters, and is captured as a look-up table, an executable equation, or another suitable form in a non-volatile memory device of the controller. Alternatively, the time constant $\tau$ may be a single parametric value.

The system determines whether rotational position of the phaser has been measured since a preceding periodic timepoint, i.e., an immediately precedent timepoint that triggered a most recent execution of the control routine for controlling the variable phasing system (306). When the rotational position of the phaser has been measured since the preceding periodic timepoint (306)(1), the rotational position of the phaser is estimated by executing an algorithm that includes EQ. 1 reduced to algorithmic code in conjunction with the monitored information and the selected time constant τ for the variable phasing system (308), and this iteration ends (312). When the rotational position of the phaser has not been measured since the preceding periodic timepoint (306) (0), the rotational position of the phaser is estimated by executing an algorithm that includes EQ. 3 reduced to algorithmic code in conjunction with the monitored information and the selected time constant τ for the variable phasing system (310), and this iteration ends (312). The estimated rotational position of the phaser is communicated to an engine controller for use in executing engine controls.

The method described herein for determining rotational position of a phaser enables rapid phaser control and improved accuracy in volumetric efficiency modelling in a variable phasing system employing a low-resolution position sensor, precluding a need to implement higher resolution position sensing systems. The phaser dynamic model estimates the phaser position between asynchronously occurring edge-triggered position measurements, permitting coupling of event-driven, asynchronous position measurement with constant-rate command and control calculations. In situations where signal measurement is noisy, or where significant time delays, lags or dynamics are introduced, a sensor model and filter can be developed to recover the correct measurement.

The invention claimed is:

1. A method to determine a rotational position of a phaser of a variable phasing system, the variable phasing system including a rotational position sensing system measuring a rotational position of the phaser, the method comprising:
periodically executing a control routine for controlling the variable phasing system responsive to a commanded position of the phaser;
estimating, by a controller, a rotational position of the phaser at a present periodic timepoint based upon a time interval between occurrence of a measured position of the phaser and the present periodic timepoint, the commanded position of the phaser, said measured position of the phaser, and a time constant of the variable phasing system when the occurrence of the measured position of the phaser is subsequent to a preceding periodic timepoint occurring at a set time interval prior to the present periodic timepoint; and
estimating a rotational position of the phaser at the present periodic timepoint based upon a time interval between the preceding periodic timepoint and the present periodic timepoint, the commanded position of the phaser, an estimated rotational position of the phaser at the preceding periodic timepoint, and the time constant of the variable phasing system when the occurrence of the measured position of the phaser is prior to the preceding periodic timepoint.

2. The method of claim 1, wherein estimating a rotational position of the phaser at a present periodic timepoint based upon a time interval between occurrence of a measured position of the phaser and the present periodic timepoint, the commanded position of the phaser, said measured position of the phaser, and a time constant of the variable phasing system when the occurrence of the measured position of the phaser is subsequent to a preceding periodic timepoint occurring at a set time interval prior to the present periodic timepoint comprises estimating the rotational position in accordance with the equation:

$$y_k = \frac{\tau - \Delta t_2}{\tau} y_{meas} + \frac{\Delta t_2}{\tau} u_{k-1}$$

wherein:
$y_k$ is the estimated rotational position at the present periodic timepoint;
$\Delta t_2$ is the time interval between the occurrence of the measured position of the phaser and the present periodic timepoint;
$u_{k-1}$ is the commanded position of the phaser;
$y_{meas}$ is the measured position of the phaser; and
τ is a time constant of the variable phasing system.

3. The method of claim 1, wherein estimating a rotational position of the phaser at the present periodic timepoint based upon a time interval between the preceding periodic timepoint and the present periodic timepoint, the commanded position of the phaser, an estimated rotational position of the phaser at the preceding periodic timepoint, and the time constant of the variable phasing system when the occurrence of the measured position of the phaser is prior to the preceding periodic timepoint comprises estimating the rotational position in accordance with the equation:

$$y_k = \frac{\tau - \Delta t_1}{\tau} y_{k-1} + \frac{\Delta t_1}{\tau} u_{k-1}$$

wherein
$y_k$ is the estimated rotational position;
$\Delta t_1$ is the periodic time interval;
$u_{k-1}$ is the commanded position of the phaser;
$y_{k-1}$ is the estimated rotational position of the phaser at the preceding periodic timepoint; and
τ is the time constant of the variable phasing system.

4. The method of claim 1, wherein periodically executing the control routine for controlling the variable phasing system responsive to the commanded position of the phaser comprises executing the control routine for controlling the variable phasing system responsive to the commanded position of the phaser at the preceding periodic timepoint and at the present periodic timepoint.

5. The method of claim 1, wherein said variable phasing system including a rotational position sensing system measuring a rotational position of the phaser comprises the rotational position sensing system measuring the position of the phaser responsive to detecting a falling edge of a target wheel of the rotational position sensing system.

6. The method of claim 5, wherein measuring the position of the phaser responsive to detecting a falling edge of a target wheel of the rotational position sensing system comprises measuring the position of the phaser asynchronously to the periodically executed control routine for controlling the variable phasing system.

7. The method of claim 1, further comprising selecting the time constant of the variable phasing system based upon a state of an engine operating parameter.

8. The method of claim 7, wherein selecting the time constant of the variable phasing system based upon a state of an engine operating parameter comprises selecting the time constant of the variable phasing system based upon engine temperature.

9. The method of claim 1, further comprising determining the time constant of the variable phasing system in response to a step input change to the commanded position of the phaser.

10. The method of claim 1, wherein the variable phasing system including a rotational position sensing system configured to monitor position of the phaser comprises a variable phasing system including a low-resolution rotational position sensing system configured to monitor position of the phaser, said low-resolution rotational position sensing system including a target wheel having a plurality of equally spaced detection edges.

11. A method to determine a rotational position of a phaser of a variable phasing system rotatably coupled to a camshaft of an internal combustion engine, the variable phasing system including a low-resolution rotational position sensing system, the method comprising:
periodically executing, by a controller, a control routine for controlling the variable phasing system responsive to a commanded position of the phaser;
asynchronously measuring a position of the phaser responsive to detecting a falling edge of a target wheel of the low-resolution rotational position sensing system;
determining a rotational position of the phaser at a present periodic timepoint based upon a time interval between occurrence of a measured position of the phaser and the present periodic timepoint, the commanded position of the phaser, said measured position of the phaser, and a time constant of the variable phasing system when the occurrence of the measured position of the phaser is subsequent to a preceding periodic timepoint occurring at a set time interval prior to the present periodic timepoint;
determining a rotational position of the phaser at the present periodic timepoint based upon a time interval between the preceding periodic timepoint and the present periodic timepoint, the commanded position of the phaser, a rotational position of the phaser determined at the preceding periodic timepoint, and the time constant of the variable phasing system when the occurrence of the measured position of the phaser is prior to the preceding periodic timepoint; and
controlling the internal combustion engine responsive to the rotational position of the phaser determined at the present periodic timepoint.

12. The method of claim 11, wherein determining a rotational position of the phaser at the present periodic timepoint based upon a time interval between a measured position of the phaser and the present periodic timepoint, the commanded position of the phaser, said measured position of the phaser, and a time constant of the variable phasing system when the occurrence of the measured position of the phaser is subsequent to a preceding periodic timepoint occurring at a set time interval prior to the present periodic timepoint comprises estimating the rotational position in accordance with:

$$y_k = \frac{\tau - \Delta t_2}{\tau} y_{meas} + \frac{\Delta t_2}{\tau} u_{k-1}$$

wherein
$y_k$ is the estimated rotational position at the present periodic timepoint;
$\Delta t_2$ is the time interval between the occurrence of the measured position of the phaser and the present periodic timepoint;
$u_{k-1}$ is the commanded position of the phaser;
$y_{meas}$ is the measured position of the phaser; and
$\tau$ is a time constant of the variable phasing system.

13. The method of claim 11, wherein estimating the rotational position of the phaser at the present periodic timepoint based upon a time interval between the preceding periodic timepoint and the present periodic timepoint, the commanded position of the phaser, an estimated rotational position of the phaser at the preceding periodic timepoint, and the time constant of the variable phasing system when the occurrence of the measured position of the phaser is prior to the preceding periodic timepoint comprises estimating the rotational position in accordance with the equation:

$$y_k = \frac{\tau - \Delta t_1}{\tau} y_{k-1} + \frac{\Delta t_1}{\tau} u_{k-1}$$

wherein
$y_k$ is the estimated rotational position;
$\Delta t_1$ is the periodic time interval;
$u_{k-1}$ is the commanded position of the phaser;
$y_{k-1}$ is the estimated rotational position of the phaser at the preceding periodic timepoint; and
$\tau$ is the time constant of the variable phasing system.

14. The method of claim 11, wherein periodically executing the control routine for controlling the variable phasing system responsive to the commanded position of the phaser comprises executing the control routine for controlling the variable phasing system responsive to the commanded position of the phaser at the preceding periodic timepoint and at the present periodic timepoint.

15. The method of claim 11, further comprising selecting the time constant of the variable phasing system based upon a state of an engine operating parameter.

16. The method of claim 15, wherein selecting the time constant of the variable phasing system based upon a state of an engine operating parameter comprises selecting the time constant of the variable phasing system based upon engine temperature.

17. The method of claim 11, further comprising determining the time constant of the variable phasing system in response to a step input change to the commanded position of the phaser.

* * * * *